United States Patent
Tu et al.

(10) Patent No.: US 7,583,831 B2
(45) Date of Patent: Sep. 1, 2009

(54) SYSTEM AND METHOD FOR USING LEARNED DISCRIMINATIVE MODELS TO SEGMENT THREE DIMENSIONAL COLON IMAGE DATA

(75) Inventors: Zhuowen Tu, San Diego, CA (US); Xiang Zhou, Exton, PA (US); Dorin Comaniciu, Princeton Jct., NJ (US); Luca Bogoni, Philadelphia, PA (US); Adrian Barbu, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 795 days.

(21) Appl. No.: 11/349,793

(22) Filed: Feb. 8, 2006

(65) Prior Publication Data

US 2006/0239552 A1 Oct. 26, 2006

Related U.S. Application Data

(60) Provisional application No. 60/660,136, filed on Mar. 9, 2005, provisional application No. 60/652,280, filed on Feb. 10, 2005.

(51) Int. Cl.
G06K 9/00 (2006.01)
(52) U.S. Cl. .................. 382/131; 382/173; 382/154
(58) Field of Classification Search ......... 382/128–132, 382/154, 173, 155–158, 256–259, 282, 270; 345/419; 378/1–5, 62–65
See application file for complete search history.

(56) References Cited

U.S. PATENT DOCUMENTS

| | | | |
|---|---|---|---|
| 6,301,329 B1 * | 10/2001 | Surridge | 378/65 |
| 6,697,508 B2 * | 2/2004 | Nelson | 382/131 |
| 7,148,887 B2 * | 12/2006 | Kaufman et al. | 345/419 |
| 2005/0207630 A1 * | 9/2005 | Chan et al. | 382/131 |
| 2005/0259855 A1 * | 11/2005 | Dehmeshki | 382/131 |
| 2005/0260658 A1 * | 11/2005 | Paladini et al. | 435/6 |
| 2005/0281447 A1 * | 12/2005 | Moreau-Gobard et al. | 382/130 |

FOREIGN PATENT DOCUMENTS

WO WO 03/070102 8/2003

OTHER PUBLICATIONS

Certis R.R., XP-002399678, May 2003, pp. 1-18.*
T. F. Chan et al., "Active Contours Without Edges," IEEE, *Trans. On Image Processing*, 10 (2), Feb. 2001.
Chen D. et al., "A Novel Approach to Extract Colon Lumen from CT Images for Virtual Colonoscopy," IEEE, *Tran. Medical Imaging*, 19:12, 2000.
Crow. F., et al., "Summed-area Tables for Texture Mapping," *Proc. Of SIGGRAPH*, 1984.

(Continued)

*Primary Examiner*—Sherali Ishrat

(57) ABSTRACT

A system and method for using learned discriminative models to segment a border of an anatomical structure in a three dimensional (3D) image is disclosed. A discriminative probability model is computed for each voxel in the 3D image. Thresholding is performed on each discriminative probability model. One or more two dimensional (2D) slices of the thresholded 3D image along X-Y planes are obtained. Seed regions are selected in the 2D slices. Morphological region growing is performed on the selected seed regions. An initial 3D segmentation is obtained. Boundary evolution is performed on the initial 3D segmentation. The segmented anatomical structure is removed. in the original 3D image.

24 Claims, 10 Drawing Sheets

OTHER PUBLICATIONS

Davies, R. H., et al., "3D Statistical Shape Models Using Direct Optimization of Description Length," ECCV, 2002.

Freund Y., et al., "A Decision-theoretic Generalization of On-Line Learninng And an Application to Boosting," *Proc. Of ICML*, 1996.

Friedman J., et al., "Additive logistic regression: a statistical view of boosting," *Dept. of Statistics, Stanford Univ. Technical Report*, 1998.

Lakare, S. et al., "Electronic Colon Cleansing Using Segmentation Rays for Virtual Colonoscopy," *SPIE Medical Imaging, Physiology and Function from Multidimensional Images*, Feb. 2002.

Mumford, D. et al., "Optimal approximation by piecewise smooth functions and associated variational problems," *Comm. Pure Appl. Math.*, 42:577-685, 1989.

Tu, Z., "Probabilistic Boosting-Tree: Learning Discriminative Models for Classification, Recognition and Clustering," *Proc. of ICCV*, 2005.

Pizer, S. et al., "Deformable M-Reps for 3D Medical Image Segmentation," *Intl. J. of Computer Vision*, 55:2, 2003.

Osher, S. et al., "Front propagating with curvature dependent speed: algorithms based on Hamilton-Jacobi formulation," *J. Of Computational Physics*, 79:12-49, 1988.

Viola, P. et al., "Fast Multi-view Face Detection," *Proc. of CVPR*, 2001.

Yang, J., "Joint Prior Models of Neighboring Objects for 3D Image Segmentation," *Proc. of CVPR*, 2004.

Yezzi, A., et al., "Stereoscopic segmentation," *Intl. J. of Computer Vision*, 53:1, 2003.

Zalis, M.E. et al., "Digital Subtraction Bowel Cleansing for CT Colonography Using Morphological and Linear Filtration Methods," *IEEE Trans. Medical Imaging*, 23:11, 2004.

Viola, Paul et al., "Rapid Object Detection using a Boosted Cascade of Simple Features," IEEE2001, pp. I511-I518.

Pham D. L. el al.: "Current Methods in Medical Image Segmentation," *Annual Review of Biomedical Engineering*, (Aug. 2000), pp. 315-337, vol. 2 Annual Review, Palo Alto CA US.

Freixenet J., et al.: "Yet another survey on Image segmentation: region and boundary information integration," *Computer Vision*, (2002) pp. 408-422, vol. 2352, Springer-Verlag, Berlin, Germany.

Grossmann, E.: "AdaTree: Boosting a Weak Classifier into a Decision Tree" IEEE Society Conference on Computer Vision and Pattern Recognition Workshops, (Jun. 27, 2004) pp. 105-106.

Pujol O et al. "Near real-time plague segmentation of IVUS," *Computers in Cardiology*, (2003) pp. 69-72, vol. 30, IEEE, New York New York US.

McNitt-Gray, M. F. et al: "Feature Selection in the Pattern Classification Problem of digital Chest Radiograph Segmentation,"*IEEE Transactions on Medical Imaging*, (Sep. 1, 1995) pp. 537-547, 14:3, IEEE Service Center, Piscataway, NJ US.

Malandain, G. et al.: "Topological segmentation of discrete surfaces," *Proceedings of the Computer Society Conference onn Computer Vision and Pattern Recognition*, (Jun. 3, 1991) pp. 444-449, IEEE Comp. Soc. Press, Lahaina, Maui, Hawaii, US.

Lorensen W E et al.: "Marching Cubes: A High Resolution 3D Surface Construction Algorithm,"*Siam Journal on Computing Society for Industrial and Applied Mathematics*, (Jul. 1, 1987) pp. 163-169, 21:4.

Jianfeng, Xu et al.: Evaluation of morphological reconstruction, fast marching and a novel hybrid segmentation method, *Computational and Information Science First International Symposium, CIS 2004 Proceedings* (Lecture Notes in Computer Science vol. 3314), Springer-Verlag Berlin, Germany pp. 678-684.

International Search Report Jul. 13, 2006.

* cited by examiner

TISSUE PATCHES

COLON PATCHES

TO TRAIN A TREE OF MAXIMUM DEPTH OF L:

- GIVEN: A TRAINING SET $S = \{(x_1, y_1, w_1), ..., (x_m, y_m, w_m)\}, x_i, \in X, y_i \in \{-1, +1\}, \sum_i w_i = 1$.
- COMPUTE THE EMPIRICAL DISTRIBUTION $q(y) = \sum_i w_i \cdot d(y_i = y)$.
- ON TRAINING SET S, TRAIN A STRONG CLASSIFIER USING A BOOSTING ALGORITHM WITH T WEAK CLASSIFIERS BUT EXIT EARLY IF $\epsilon'_t > q$, E.G. $q = 0.45$.
- IF THE CURRENT TREE DEPTH IS L THEN EXITS.
- INITIALIZE TWO EMPTY SETS $S_{left}$ AND $S_{right}$.
- FOR EACH SAMPLE $(x_i, y_i)$, COMPUTE THE PROBABILITY $q(+1|x_i)$ AND $q(-1|x_i)$ USING THE LEARNED STRONG CLASSIFIER.
- IF $q(+1|x_i) - \frac{1}{2} > e$ THEN $(x_i, y_i, 1) \rightarrow S_{right}$
- ELSE IF $q(-1|x_i) - \frac{1}{2} > e$ THEN $(x_i, y_i, 1) \rightarrow S_{left}$
  - ELSE $(x_i, y_i, q(+1|x_i)) \rightarrow S_{right}$ AND $(x_i, y_i, q(-1|x_i)) \rightarrow S_{left}$.
- NORMALIZE ALL THE WEIGHTS OF THE SAMPLES IN $S_{left}$.
- REPEAT THE PROCEDURE RECURSIVELY.
- NORMALIZE ALL THE WEIGHTS OF THE SAMPLES IN $S_{right}$.
- REPEAT THE PROCEDURE RECURSIVELY.

FIG. 5

SYSTEM AND METHOD FOR USING LEARNED DISCRIMINATIVE MODELS TO SEGMENT THREE DIMENSIONAL COLON IMAGE DATA

CROSS REFERENCE TO RELATED APPLICATIONS

This application claims the benefit of U.S. Provisional Application Ser. No. 60/652,280 filed on Feb. 10, 2005, and U.S. Provisional Application Ser. No. 60/660,136, filed on Mar. 9, 2005 which are incorporated by reference in their entirety.

FIELD OF THE INVENTION

The present invention is directed to a system and method for segmenting an anatomical structure in a three dimensional image, and more specifically, to a system and method for segmenting three dimensional colon image data by using learned discriminative models to delineate foreground and background image data.

BACKGROUND OF THE INVENTION

Colon cancer is one of the leading causes of death in the U.S. The number of deaths can be largely reduced if polyps can be detected and treated at their early stage of development. Virtual colonoscopy is a new technology being developed to help doctors find polyps in three dimensional (3D) computed tomography (CT) image data. However, it currently requires that the colon be physically cleansed prior to the CT scan. This is very inconvenient and prevents virtual colonoscopy from being a general screening tool for a large population.

The task of automatic segmentation is very challenging. First, the CT data is taken without bowel cleansing in order to minimize the inconvenience to patients. Tagged materials, such as stool, though mostly depicted as bright areas in the image, are a big distraction. Second, polyps of interest are very small and don't have unique intensity patterns, nor have any special shapes. It is hard to distinguish them from the colon wall, especially when they are surrounded by tagged material. Third, the volumetric data to be processed is massive (e.g., 400×512×512), which eliminates the possibility of using any computationally expensive method.

By tagging residual materials (e.g., stool) to make them appear bright under CT, the materials can be electronically removed. This becomes essentially a segmentation problem in which the task is to delineate and locate the colon wall. This process is also referred to as colon detagging. However, residual materials observe large variation in appearance depending upon where they are, what the patient eats, and how much they are tagged. Furthermore, the challenge of segmenting an uncleansed colon comes from the fact that residual materials and colon walls observe complex patterns, which are hard to separate. This is representative of a large class of problems in medical imaging and vision in which the task is to perform foreground/background segmentation.

Existing approaches often define certain appearance models (mostly independently identically distributed (i.i.d.)) for the foreground and background followed by an energy minimization procedure. However, these models, such as Gaussian, only work in very constrained situations since it is difficult to use them to capture the larger intra-class variability and inter-class similarity. There is a need for a learning based approach using learned discriminative models for the appearance of complex foreground and background images.

SUMMARY OF THE INVENTION

The present invention is directed to a system and method for using learned discriminative models to segment a border of an anatomical structure in a three dimensional (3D) image. A discriminative probability model is computed for each voxel in the 3D image. Thresholding is performed on each discriminative probability model. One or more two dimensional (2D) slices of the thresholded 3D image along X-Y planes are obtained. Seed regions are selected in the 2D slices. Morphological region growing is performed on the selected seed regions. An initial 3D segmentation is obtained. Boundary evolution is performed on the initial 3D segmentation. The segmented anatomical structure is removed in the original 3D image.

BRIEF DESCRIPTION OF THE DRAWINGS

Preferred embodiments of the present invention will be described below in more detail, wherein like reference numerals indicate like elements, with reference to the accompanying drawings:

FIG. 5 provides an outline of a probabilistic boosting tree algorithm in accordance with the present invention;

DETAILED DESCRIPTION

The present invention is directed to a system and method for using learned discriminative models to detect the appearance of complex foreground and background in an image using a probabilistic boosting tree and boundary evolution. Such a method is particularly effective in the segmentation and delineation of a colon border in 3D colon image data. In accordance with one embodiment of the present invention, residual material (e.g., stool) is segmented from the colon wall by tagging the residual material. The tagged residual material is given a high intensity so that it shows up as bright areas in the image. A learning based method is then used to determine the presence of the colon border.

Figure 1:
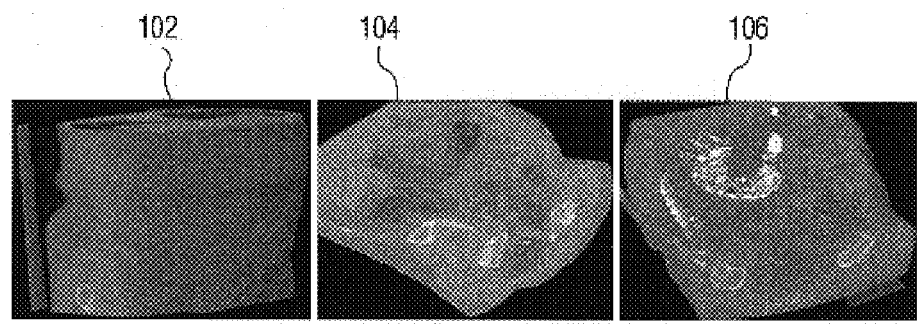
FIG. 1 illustrates different views of a 3D CT image of a colon.

Such image data can be obtained using different imaging modalities such as Computed Tomography (CT), X-ray or Magnetic Resonance Imaging (MRI). FIG. 1 illustrates a number of views of a colon. The first image 102 shows a complete CT volume of a section of a colon. There are two types of objects inside a colon, air and stool. Though most of them appear to be either very dark (e.g., air) or very bright if successfully tagged, there are still a large portion of residual materials which have similar intensity values as normal tissue due to poor tagging. In addition, there are two types of tagging methods, liquid or solid, which make the appearances of residual materials very different. Residual materials (e.g., stool) are tagged to make them appear bright under CT and can be removed electronically. The middle image 104 shows a CT image of a physically cleansed colon. Image 106 shows a CT image of an uncleansed colon which has been tagged.

The present invention uses a learning based approach to try to learn the appearance models for the foreground and background of an image based on a large set of data which has been annotated by experts, such as physicians or medical technicians. This results in a system which is highly adaptive. To account for large intra-class variability, a probabilistic boosting tree learning framework is adopted to learn the complex discriminative models of the foreground and background. A large neighborhood around each voxel is considered to account for contextual information in the learning phase of the discriminative models. Contextual information is implicitly placed in the discriminative models which are turned into a pseudo-likelihood model ratio. This is done by learning the discriminative models of each voxel based on its surrounding voxels. Integral volumes and 3D Haar wavelets are designed to rapidly compute features in learning and computing the discriminative models. In addition, a 3D sliced volume representation is used for boundary evolution to minimize the total energy. The region topology is explicitly coded on the grid node of each slice of the volume. Thus, the neighborhood boundaries can be traced explicitly.

Figure 2:
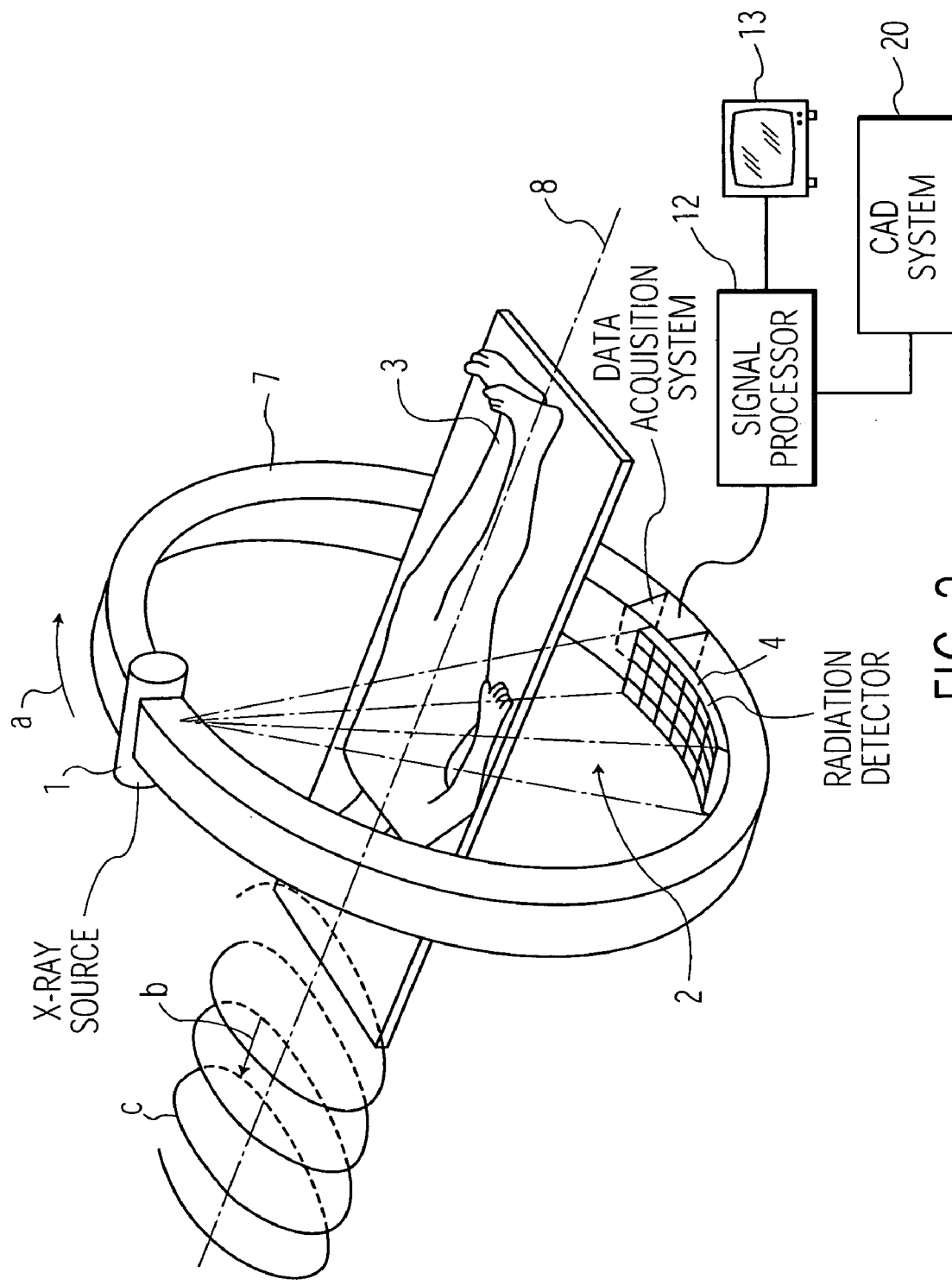
FIG. 2 is a schematic diagram of an exemplary Computed Tomography (CT) system in accordance with the present invention.

FIG. 2 schematically depicts an exemplary Computed Tomography (CT) system in accordance with the present invention. The CT system in conjunction with a Computed Aided Detection (CAD) system can be used to perform a non-invasive procedure on a patient to screen for various medical conditions. Examples of such procedures are virtual colonoscopies or chest screenings for the presence of lesions and possibly cancerous tissue. It is to be understood by those skilled in the art that other imaging modalities can be used without departing from the scope and spirit of the present invention. For example, magnetic resonance imaging (MRI), fluoroscopy or ultrasound imaging could also be used to obtain the imagines. For purposes of explanation, the present invention will be described in the context of use of an exemplary Computed Tomography (CT) system. CT images of a colon are obtained which may then be segmented and used to detect polyps.

The CT is equipped with an X-ray source 1, emitting a pyramidal X-ray beam 2, whose marginal rays are represented by the dot-dashed lines in FIG. 1 that penetrates an object 3 to be examined, for example, a patient, and that is incident on a radiation detector 4. The X-ray source 1 and the radiation detector 4 are, in the exemplary embodiment, mounted opposite to one another on an annular gantry 7.

The X-ray source 1 and the radiation detector 4 thus form a metrological system that can be rotated around the system axis 8 so that the patient 3 can be X-rayed at various projection angles relative to said system axis 8 and at various positions along the system axis 8. The resultant output signals of the individual detector elements are read out by a data acquisition system 10. The signals are sent to a signal processor 12 that computes an image of the patient 3 that, in turn, can be displayed on a monitor 13.

The images scanned by the CT system and computed by the signal processor 12 are transmitted to a CAD system 20 for further processing. The CAD system 20 tags the residual materials which may or may not be electronically removed. A learning based approach is used to segment the colon.

Figure 3:
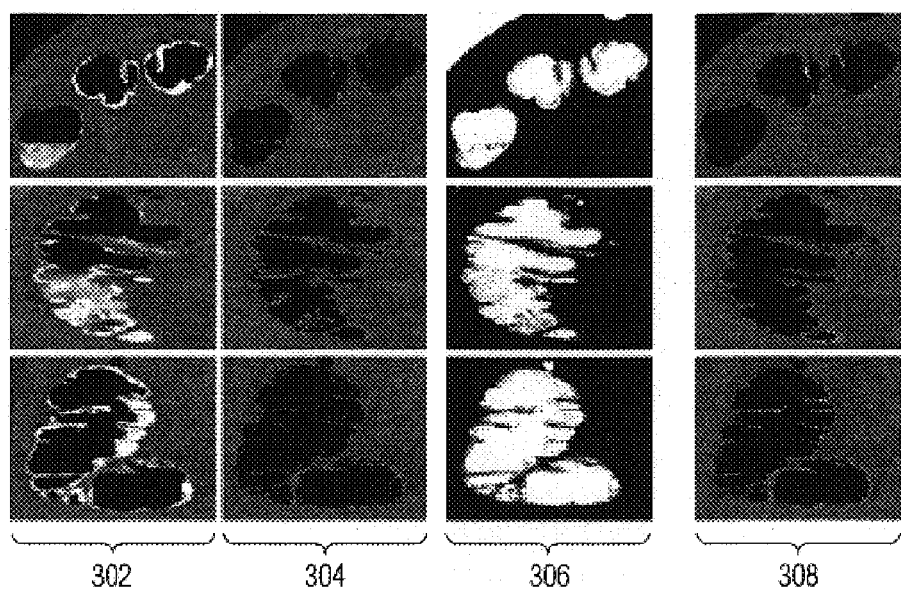
FIG. 3 illustrates image slices of a colon along different planes in a challenging place and in different views in accordance with the present invention.

FIG. 3 illustrates three image slices 302 of a colon along different planes in a challenging place. Images 304 display the results of thresholding at an optimal value. A "ring" effect is observed due to the influence of tagged materials relative to the air. These interface voxels have similar intensity patterns as tissues. Images 306 display the saliency or probability maps $p(y=+1|V(N(s)))$ at 0.5, where V is the input volume, N(s) is the sub-volume centered at voxel s and y is the label for each voxel. The results are much better than thresholding but the borders are a bit jagged. Images 308 display the results by thresholding on $p(y=+1|V(N(s)))$ as a soft value with a local shape prior in the energy minimization formulation. Note that $p(y=+1|V(N(s)))$ is the posterior probability of a voxel s belonging to the foreground (i.e., colon) given the sub-volume centered at s.

Intuitively, the decision of where to place the colon boundary should be made jointly according to the overall shape and appearance of the colon. For a segmentation W, $W=(R_{-1}, R_{+1})$, where $R_{-1}$ and $R_{+1}$ are the domains for the background and foreground respectively. Contextual information can be put into a pseudo-likelihood model as follows:

$$p(W|V) \propto \prod_{s \in R_{-1}} p(V(s), y = -1|V(N(s)/s)) \cdot \prod_{s \in R_{+1}} p(V(s), y \quad (1)$$
$$= +1|V(N(s)/s)) \cdot p(R_{-1}, R_{+1})$$

where $p(R_{-1}, R_{+1})$ is the shape prior of the colon border, N(s) is the sub-volume centered at voxel s, and y is the label for each voxel. The goal is to find the optimal W* that maximizes the posterior p(W|V). The pseudo-likelihood model indicates that the likelihood of each voxel belonging to either foreground or background is decided by its own intensity and its neighboring voxels.

To learn the pseudo-likelihood model, let $$-\log p(W|V) = E_1 + E_2 + E_c \quad (2)$$

where $E_c$ is a constant and doesn't depend on $R_{-1}$ and $R_{+1}$, and $E_1 = -\log p(R_{-1}, R_{+1})$ and $$E_1 = -\sum_{s \in R_{-1}} \log p(V(s), y \quad (3)$$
$$= -1|V(N(s)/s)) - \sum_{s \in r_{+1}} \log p(V(s), y$$
$$= +1|V(N(s)/s))$$
$$= -\sum_{s \in \Lambda} \log p(V(s), y$$
$$= -1|V(N(s)/s)) - \sum_{s \in R_{+1}} \log \frac{p(y = +1|V(N(s)))p(y = -1)}{p(y = -1|V(N(s)))p(y = +1)}.$$

The first term in the above equation doesn't depend on $R_{-1}$ and $R_{+1}$. Therefore, maximizing the probability $p(W|V)$ is equivalent to minimizing the energy $$E = -\sum_{s \in R_{+1}} \log \frac{p(l=+1|V(N(s)))}{p(l=-1|V(N(s)))} - |R_{+1}| \cdot \log \frac{p(y=-1)}{p(y=+1)} - \log p(R_{-1}, R_{+1}) \quad (4)$$

Therefore, the pseudo-likelihood ratio is nicely turned into the discriminative probability model (classification) ratio. Note that $p(y=+1|V(N(s)))$ is the posterior probability of a voxel s belonging to the foreground (e.g., colon) given the patch centered at s. The optimal segmentation W* is the one that minimizes the above energy E.

Figure 4A:
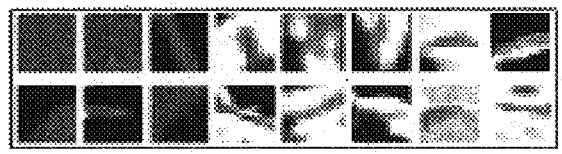
FIG. 4 illustrates a plurality of tissue patches and colon patches.
Figure 4B:
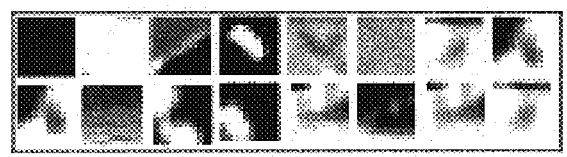

Next the discriminative model $p(y|V(N(s)))$ for each voxel s given a sub-volume centered at s is learned and computed. FIG. 4 illustrates a plurality of tissue patches and colon patches. As can be seen from the foreground and background, these images observe complex patterns. Therefore, a model must be able to combine various kinds of information together, e.g., intensity and gradient at voxel s and its surrounding voxels in the patch, which are used to support the decision on s as context information. The present invention adopts a learning framework, probabilistic boosting tree for learning complicated discriminative models.

FIG. 5 illustrates the procedure for training a boosting tree in accordance with the present invention. In accordance with the present invention, the strong classifier can be AdaBoost, RealBoost or another boosting method. For notational simplicity, the probabilities computed by each AdaBoost method are denoted as $$q(+1|x) = \frac{\exp\{2f(x)\}}{1 + \exp\{2f(x)\}}, \quad (5)$$

and $$q(-1|x) = \frac{\exp\{-2f(x)\}}{1 + \exp\{-2f(x)\}}.$$

The algorithm is intuitive. It recursively learns a tree. At each node, a strong classifier is learned using a standard boosting algorithm. The training samples are then divided into two new sets using the learned classifier, the left one and the right one, which are then used to train a left sub-tree and right sub-tree respectively. Under this model, positive and negative samples are naturally divided into sub-groups.

Figure 6:
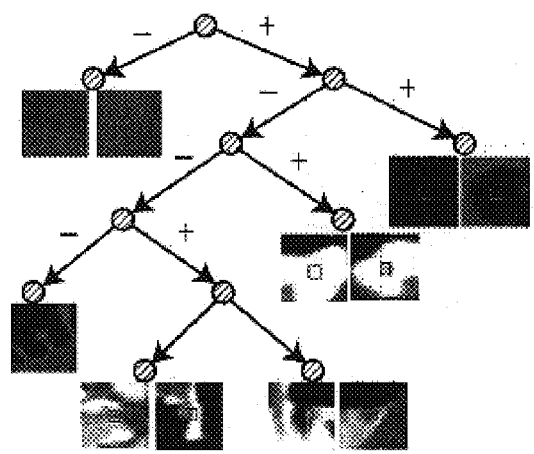
FIG. 6 illustrates a probability boosting tree in accordance with the present invention.

FIG. 6 illustrates an abstract version of a tree learned. Samples which are hard to classify are passed further down leading to the expansion of the tree. Clustering of positives and negatives is naturally performed by serving the other as auxiliary variables. Since each tree node is a strong classifier, it can deal with samples of complex distributions.

Given a 3D volume, the procedure to compute the posterior probability for its center voxel is consistent with the training stage. It computes the probability at each node according to which it decides to pass into either the left, the right or both sub-trees. At the top of the tree, information is accumulated from its descendants and an overall posterior distribution is reported.

Each training sample is of size 31×31×31 and the classification model $p(y|V(N)(s)))$ is learned for the center voxel s. Boosting tree selects and combines a set of weak classifiers into a strong classifier out of a large number of candidates.

Given a specific feature, its corresponding weak classifiers can be learned to separate positives and negatives, based on their weights. The overall performance of the final classifier is decided by how informative the selected features are and how fast they can be computed.

The present invention uses a probabilistic boosting tree to learn pseudo-likelihood models for complex patterns. Integral volumes and 1D, 2D and 3D Haar wavelets are designed for fast computation. A 3D representation is used to efficiently evolve the boundary. This system is capable of automatically segmenting a colon volume of 512×512×400 in 2~3 minutes. The system learns the pseudo-likelihood models based on a large annotated database, which makes it very general and highly adaptive.

Figure 7:
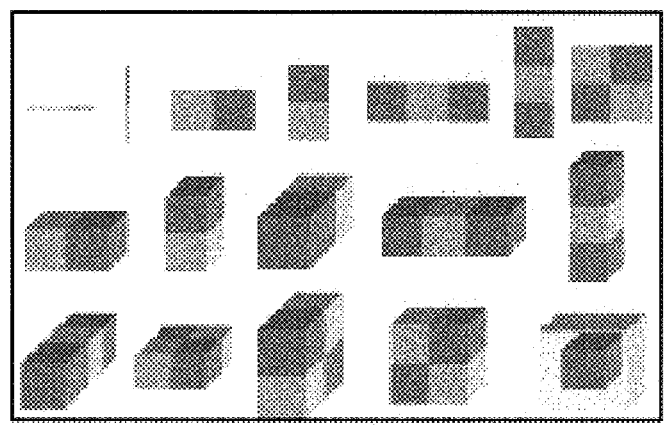
FIG. 7 illustrates examples of Haar wavelet filters in accordance with the present invention.

For a training sample, the features are the intensity and gradient values at the center voxel and it surrounding voxels. Also, 1D, 2D and 3D Haar wavelets are designed at various locations with different aspect ratios to obtain features, which are shown in FIG. 7. There are around 25,000 candidate features each of which corresponds to a weak classifier. For an input volume, the integral volume is computed first. At each location $(x_1, y_1, z_1)$, the integral volume is computed $$\int_{x_1} \int_{y_1} \int_{z_1} V(x, y, z) dx dy dz.$$

The computational cost of computing Haar wavelets is largely reduced since for each computation, only the values of the corners of the Haar in the integral volume need to be computed. Also, due to the tree structure as illustrated in FIG. 6, the majority of the sub-volumes are only passed onto the top levels without consuming much time. The results of these computations are shown in FIG. 3.

Once the discriminative model $p(y|V(N(s)))$ for each voxel s is computed, the optimal segmentation that minimizes the energy is searched. If thresholding at 0.5 based on $p(y=+1|V(N(s)))$ is done as shown in images 308 in FIG. 3, the colon borders are not so smooth and the bones are also segmented. As such, the algorithm proceeds for two more steps: (1) Based on thresholding $p(y|V(N(s)))$, sample slices are taken along the x-y plane to select some regions which observe round shape. Morphological region growing is used to obtain an initial 3D segmentation. (2) A new 3D representation is designed, i.e., a frameline structure, which explicitly records the topology of the 3D colon to perform boundary evolution. The prior $p(R_{-1}, R_{+1})$ favors a smooth boundary.

Figures 8A, 8B, 8C:
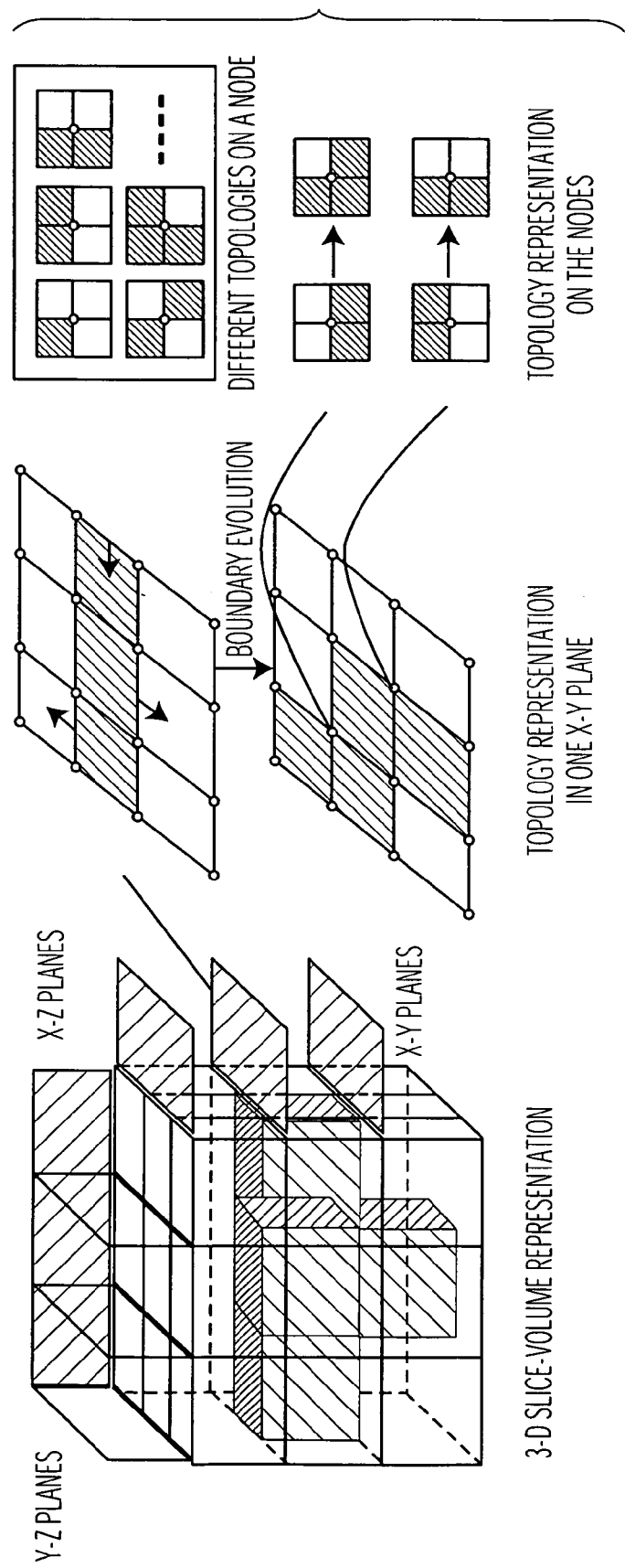
FIGS. 8($a$)-8($c$) illustrates an example of a 3D topology representation for boundary evolution in accordance with the present invention.

In accordance with the present invention, a new 3D representation, sliced-volume, for boundary evolution is designed. Instead of representing the topology implicitly by different level sets, the topologies are coded explicitly on the grid node of each slice of a volume. Thus, the neighborhood structure of the boundaries can be traced explicitly. FIGS. 8(a)-8(c) illustrate such an example of a 3D topology representation for boundary evolution. FIG. 8(a) illustrates the explicit coding of a label for each voxel indicating whether it is on the foreground, +1, or on the background, −1. For each voxel in the volume V, its label is explicitly coded +1 if it is on the foreground (i.e., colon part), and −1 if it is on the background. With only the label map, the process of boundary evolution is not easily facilitated. The segmentation topology is coded at each slice along XY, XZ and YZ planes as illustrated in FIG. 8(b). On each slice, boundary nodes are those whose four corners have two types of labels. Each possible situation for a boundary node on the grid is coded which is illustrated in FIG. 8(c).

Given any grid node on the boundary, its most immediate nodes (clockwise or counterclockwise) can be obtained based on the configuration of the current nodes and its four connected neighboring nodes. It is noted that special care needs to be taken on the nodes along the edge of the volume. Therefore, at each grid node on the boundary, its normal direction, curvature, etc. are explicitly computed. The explicit 3D representation allows for the property that the foreground is connected. This is often a desirable property in object specific segmentation in which occlusion usually does not exist. One object is defined by a connected region.

The term $p(R_{-1}, R_{+1})$ for shape prior is left undefined in equation (4). Indeed, part of the shape information is implicitly modeled in the discriminative model $p(y|V(N(s)))$. Intuitively, the possibility of a voxel label is decided by its own intensity and the appearances of its surrounding voxels based on various features including gradients and curvatures. This implicitly reinforces certain degrees of spatial and appearance coherences. In addition, an explicit shape prior term is used to encourage a compact region to make the boundary smooth. Let A be the surface between $R_{-1}$ and $R_{+1}$ and $\Lambda_{XY,t}$ be the boundary on the t XY plane.

$$-\log p(R_{-1}, R_{+1}) = \alpha \int_A ds \qquad (6)$$

By Euler-Lagrange equation on E in equation (6), equation (4) is obtained and results in $$\frac{dE}{ds} = -\left(\log \frac{p(y=+1|V(N(s)))}{p(y=-1|V(N(s)))} + \log \frac{p(y=-1)}{p(y=+1)} + \alpha H\right) n \qquad (7)$$

where H and n are the mean curvature and normal direction at s respectively. The boundary evolution is performed using the above evolution equation based on the slice-volume representation described above.

Figure 9:
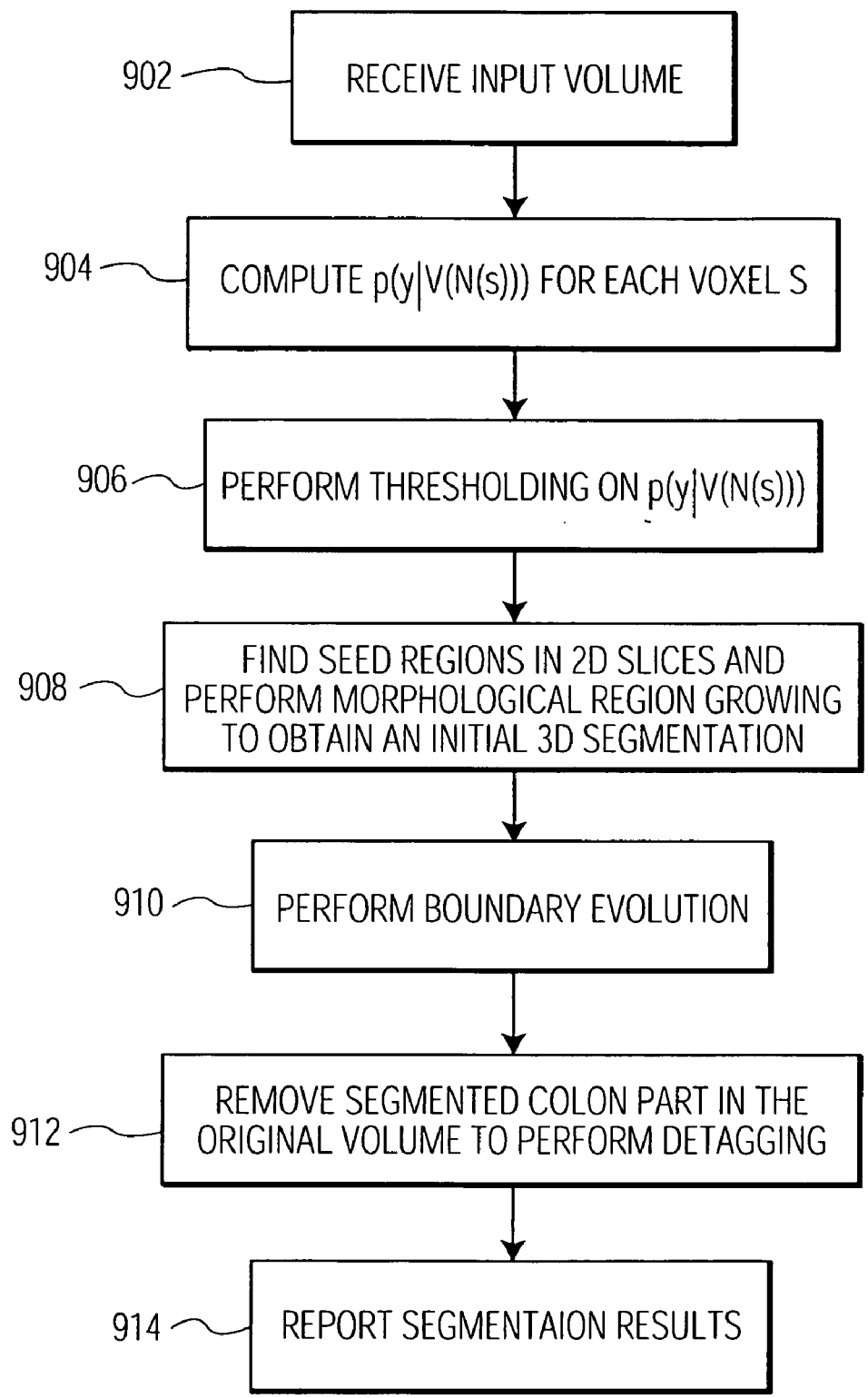
FIG. 9 is a flow chart that outlines a method for using learned discriminative models to detect appearance of complex foreground and background in an image using a probabilistic boosting technique in accordance with the present invention.
Figure 10:
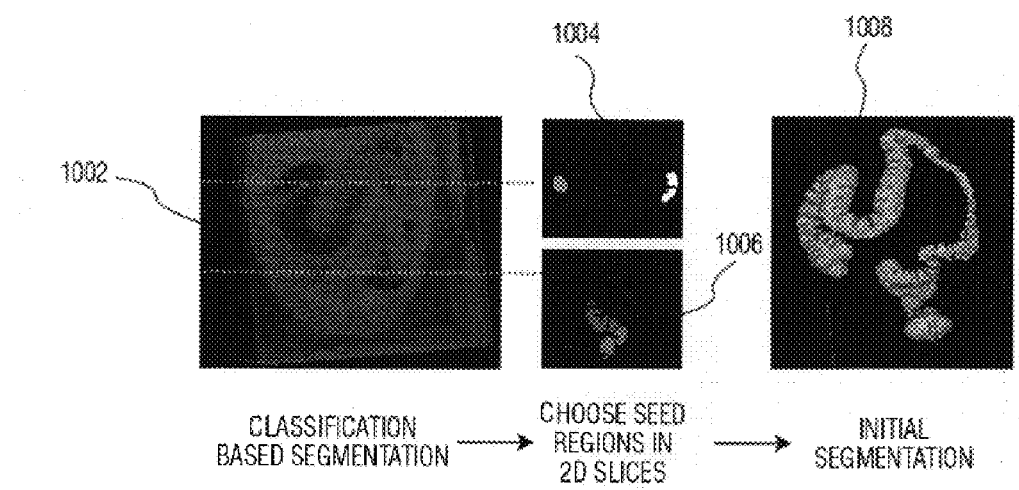
FIG. 10 illustrates an initial segmentation of a colon in accordance with the method of the present invention.

FIG. 9 illustrates a general outline for a method for using learned discriminative models to detect appearance of complex foreground and background in an image using a probabilistic boosting technique in accordance with the present invention. An input volume is received for which segmentation is to be performed (step 902). A discriminative model $p(y|V(N(s)))$ is computed for each voxel s (step 904). Next thresholding is performed on $p(y|V(N(s)))$ (step 906). Based on the thresholding, a number of sample image slices on the threshold volume are obtained along the X-Y planes. The colon part in these slices appears to be more or less round as is shown in FIG. 10.

Next seed regions are found in the 2D slices and morphological region growing is performed to obtain an initial 3D segmentation (step 908). The seed regions are selected based on its size and shape. Examples of chosen seed regions are shown in images 1004 and 1006. An initial segmentation shown in image 1008 is then obtained using the morphological region growing. Boundary evolution is performed to obtain refined segmentation (step 910). The segmented colon part in the original input volume is then removed and detagging is performed (step 912). All segmentation results are then reported (step 914).

Figure 11:
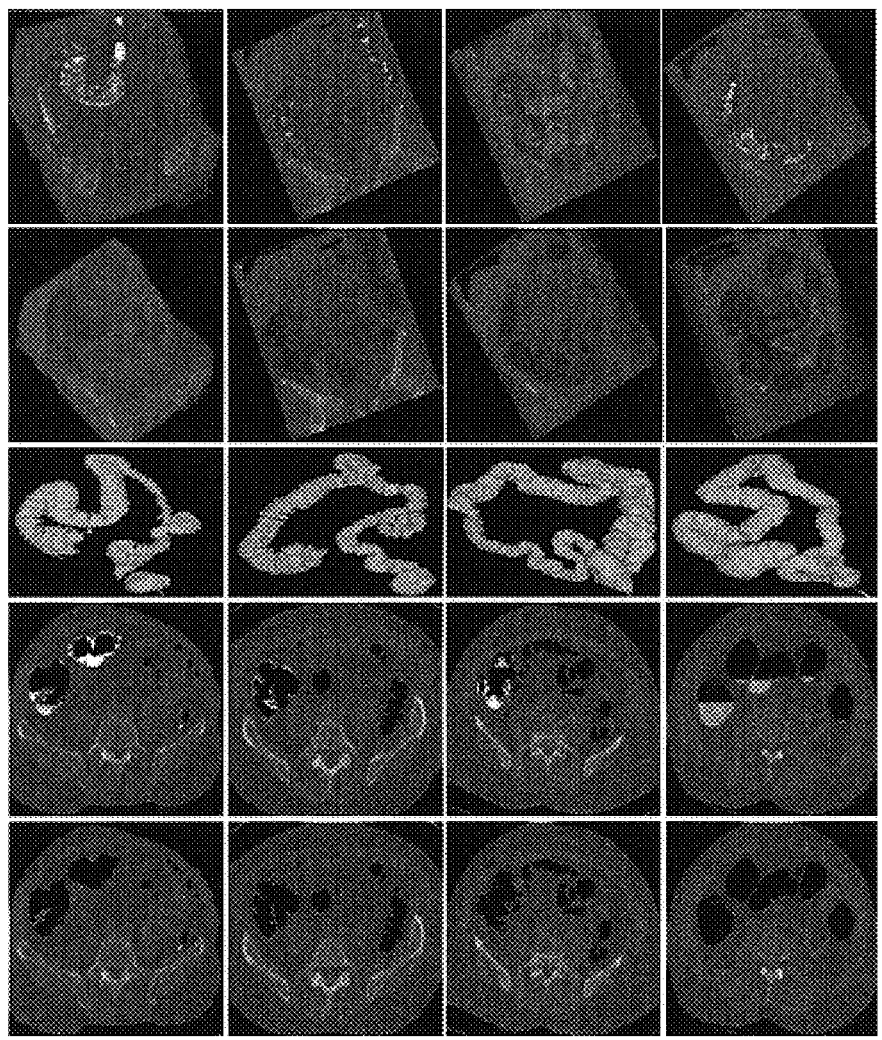
FIG. 11 illustrates some examples of colon segmentation in accordance with the present invention.

FIG. 11 illustrates some examples of colon segmentation in accordance with the present invention. The first row of images 1102 illustrates some input volumes. The first three images in row 1102 show solid tagging and the last image shows liquid tagging. The second row 1104 of images illustrates the volume by segmenting out the colon volume. The third row 1106 of images demonstrates the only the colon volume. The fourth row 1108 of images illustrates some 2D slice views of the input volume. The fifth row 1110 of images illustrates the corresponding slice views after detagging has been performed.

Having described embodiments for a system and method for using learned discriminative models to detect the appearance of complex foreground and background in an image using a probabilistic boosting tree, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for using learned discriminative models to segment a border of an anatomical structure in a three dimensional (3D) image comprising the steps of:
   computing a discriminative probability model for each voxel in the 3D image;
   performing thresholding on each discriminative probability model;
   obtaining one or more two dimensional (2D) slices of the thresholded 3D image along X-Y planes;
   selecting seed regions in the 2D slices;
   performing morphological region growing on the selected seed regions;
   obtaining an initial 3D segmentation;
   performing boundary evolution on the initial 3D segmentation; and
   removing the segmented anatomical structure in the original 3D image.

2. The method of claim 1 wherein the learned discriminative model is computed using a probabilistic boosting tree.

3. The method of claim 2 wherein for a given specific feature, a corresponding weak classifier is learned to separate positives and negatives based on their weights.

4. The method of claim 3 wherein specific features include at least one of intensity, gradient values, curvatures at a center voxel and its surrounding voxels.

5. The method of claim 3 wherein Haar filters are used to obtain features.

6. The method of claim 1 wherein the seed regions are selected based on size and shape.

7. The method of claim 1 wherein the step of performing boundary evolution further comprises the steps of:
   explicitly coding a +1 label on each voxel in the 3D image that is on the foreground of the image;
   explicitly coding a −1 label on each voxel in the 3D image that is on the background of the image;
   coding segmentation topology at each slice along XY, XZ and YZ planes; and
   identifying boundary nodes for each slice.

8. The method of claim 7 wherein the foreground represents the anatomical structure.

9. The method of claim 8 wherein the anatomical structure is an uncleansed colon.

10. The method of claim 1 further comprising the step of:
    performing detagging on the segmented anatomical structure.

11. The method of claim 1 further comprising the step of: reporting final segmentation results.

12. The method of claim 1 wherein the discriminative probability model is $$p(y|V(N(s)))$$

where V is the input volume, N(s) is the sub-volume centered at voxel s and y is the label for each voxel.

13. A system for segmenting a three dimensional (3D) image of an anatomical structure comprises:
a processor that receives the 3D image of the anatomical structure, the processor performing the following steps:
computing a discriminative probability model for each voxel in the 3D image;
performing thresholding on each discriminative probability model;
obtaining one or more two dimensional (2D) slices of the thresholded 3D image along X-Y planes;
selecting seed regions in the 2D slices;
performing morphological region growing on the selected seed regions;
obtaining an initial 3D segmentation;
performing boundary evolution on the initial 3D segmentation; and
removing the segmented anatomical structure in the original 3D image; and
a display for displaying the segmented anatomical structure.

14. The system of claim 13 wherein the learned discriminative model is computed using a probabilistic boosting tree.

15. The system of claim 14 wherein for a given specific feature, a corresponding weak classifier is learned to separate positives and negatives based on their weights.

16. The system of claim 15 wherein specific features include at least one of intensity, gradient values, curvatures at a center voxel and its surrounding voxels.

17. The system of claim 16 wherein Haar filters are used to obtain features.

18. The system of claim 13 wherein the seed regions are selected based on size and shape.

19. The system of claim 13 wherein the step of performing boundary evolution further comprises the steps of:
explicitly coding a +1 label on each voxel in the 3D image that is on the foreground of the image;
explicitly coding a −1 label on each voxel in the 3D image that is on the background of the image;
coding segmentation topology at each slice along XY, XZ and YZ planes; and
identifying boundary nodes for each slice.

20. The system of claim 19 wherein the foreground represents the anatomical structure.

21. The system of claim 20 wherein the anatomical structure is an uncleansed colon.

22. The system of claim 13 further comprising the step of: performing detagging on the segmented anatomical structure.

23. The system of claim 13 further comprising the step of: reporting final segmentation results.

24. The system of claim 13 wherein the discriminative probability model is $$p(y|V(N(s)))$$

where V is the input volume, N(s) is the sub-volume centered at voxel s and y is the label for each voxel.

* * * * *